(12) United States Patent
Zhang et al.

(10) Patent No.: US 12,259,259 B2
(45) Date of Patent: Mar. 25, 2025

(54) METHOD AND DEVICE FOR GENERATING MAP DATA

(71) Applicant: GRABTAXI HOLDINGS PTE. LTD., Singapore (SG)

(72) Inventors: Ying Zhang, Singapore (SG); Jagannadan Varadarajan, Singapore (SG); Roger Zimmermann, Singapore (SG); Guanfeng Wang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/020,595

(22) PCT Filed: Jul. 7, 2021

(86) PCT No.: PCT/SG2021/050395
§ 371 (c)(1),
(2) Date: Feb. 9, 2023

(87) PCT Pub. No.: WO2022/035373
PCT Pub. Date: Feb. 17, 2022

(65) Prior Publication Data
US 2023/0304826 A1    Sep. 28, 2023

(30) Foreign Application Priority Data
Aug. 14, 2020   (SG) .......................... 10202007811Q

(51) Int. Cl.
*G01C 21/00* (2006.01)
*G06N 3/0475* (2023.01)
*G06N 3/094* (2023.01)

(52) U.S. Cl.
CPC ..... *G01C 21/3852* (2020.08); *G01C 21/3848* (2020.08); *G06N 3/0475* (2023.01); *G06N 3/094* (2023.01)

(58) Field of Classification Search
CPC ............ G01C 21/3852; G01C 21/3848; G01C 21/3822; G06N 3/0475; G06N 3/094; G06N 3/045; G06N 3/047; G06N 3/084
See application file for complete search history.

(56) References Cited

U.S. PATENT DOCUMENTS 7,962,281 B2    6/2011  Rasmussen et al.
2016/0239983 A1*  8/2016  Dorum ................... G01C 11/04
(Continued)

FOREIGN PATENT DOCUMENTS

CN         111080645         4/2020

OTHER PUBLICATIONS

International Search Report for Application No. PCT/SG2021/050395, mailed Oct. 15, 2021 (5 pages).
(Continued)

*Primary Examiner* — Nga X Nguyen
(74) *Attorney, Agent, or Firm* — Buckley, Maschoff & Talwalkar LLC

(57) ABSTRACT

A method for generating map data comprising training a generator neural network by acquiring training data elements and training a generative adversarial network, comprising training a generator neural network to generate, for a satellite image and a road usage image of a training data element, the map data image of the training data element and comprising generating map data for a geographical region by acquiring road usage information specifying which parts of a geographical area have been used for driving a vehicle, acquiring a satellite image of the geographical area, forming a road usage image of the geographical area which has pixels, each pixel corresponding to a respective part of the geographical area and having a value indicating whether its part of the geographical area is specified by the road usage information to have been used; and feeding the satellite
(Continued)

image and the road usage image to the trained generator neural network.

18 Claims, 5 Drawing Sheets

(56) References Cited

U.S. PATENT DOCUMENTS

| | | | |
|---|---|---|---|
| 2017/0365093 A1 | 12/2017 | Stacey | |
| 2020/0098135 A1* | 3/2020 | Ganjineh | G06F 16/587 |
| 2020/0311985 A1* | 10/2020 | Jeong | G06T 11/00 |
| 2021/0108926 A1* | 4/2021 | Tran | G06T 17/05 |
| 2022/0245936 A1* | 8/2022 | Valk | G06V 10/764 |

OTHER PUBLICATIONS

Written Opinion for Application No. PCT/SG2021/050395, mailed Oct. 15, 2021 (6 pages).

International Preliminary Report on Patentability for App No. PCT/SG2021/050395, Feb. 7, 2023 (7 pages).

Zhang et al., "Aerial Image Road Extraction Based on an Improved Generative Adversarial Network", Remote Sensing, Special Issue: Deep Transfer Learning for Remote Sensing, vol. 11, No. 930, Apr. 17, 2019, pp. 1-19.

Shi et al., "Road Detection from Remote Sensing Images by Generative Adversarial Networks", IEEE, Access: Special Section on Advanced DATA Analytics for Large-Scale Complex Data Environments, Nov. 13, 2017, vol. 6, pp. 25486-25494.

Park, "Refining Inferred Road Maps Using GANs", Master of Engineering, Thesis, Department of Electrical Engineering and Computer Science, MIT, Jun. 30, 2019, pp. 1-64.

Ganguli et al., "GeoGAN: A Conditional GAN with Reconstruction and Style Loss to Generate Standard Layer of Maps from Satellite Images", arXiv preprint arXiv: 1902.05611, 2019, pp. 1-18.

Li, et al., "MapGAN: An Intelligent Generation Model for Network Tile Maps", Sensors, MDPI, 2020, pp. 1-19.

Isola et al., "Image-to-Image Translation with Conditional Adversarial Networks", Proceedings of the IEEE Conference on Computer Vision and Pattern Recognition, 2017, (16 pages).

Chen et al., "$S^2$OMGAN; Shortcut from Remote Sensing Images to Online Maps", arXiv preprint arXiv;2001.07714, 2020, pp. 1-23.

\* cited by examiner

METHOD AND DEVICE FOR GENERATING MAP DATA

TECHNICAL FIELD

Various aspects of this disclosure relate to methods and devices for generating map data.

BACKGROUND

The quality of an e-hailing service which enables customers to hail taxis using their smartphones largely depends on the underlying map data which is for example used for estimating the time when the driver will be there to pick up the user, a price of the ride and how long it will take to get to the destination and for providing navigation information to the driver. Accordingly, it is desirable to keep this map data up-to-date with the real world. However, generating and updating of maps may require a high amount of resources since road networks are complex and may frequently change, e.g. because of new roads being built, roads no longer being usable (e.g. being closed because of construction) or no longer being preferred (e.g. due to an introduced toll, frequent traffic jams, etc.). Accordingly, efficient approaches for generating map data are desirable.

SUMMARY

Various embodiments concern a method for generating map data comprising training a generator neural network by acquiring training data elements for a generative adversarial network, each training data element comprising a satellite image of a geographical area, a road usage image of the geographical area which shows routes in the geographical area which may be used for driving a vehicle and a map data image of the geographical area and training a generative adversarial network comprising the generator neural network using the training data elements, comprising training the generator neural network to generate, for a satellite image and a road usage image of a training data element, the map data image of the training data element and comprising generating map data for a geographical region by acquiring road usage information specifying which parts of a geographical area have been used for driving a vehicle, acquiring a satellite image of the geographical area, forming a road usage image of the geographical area which has pixels, each pixel corresponding to a respective part of the geographical area, such each pixel has a pixel value indicating whether the part of the geographical area, to which the pixel corresponds, is specified by the road usage information to have been used for driving a vehicle and feeding the satellite image and the road usage image to the trained generator neural network.

According to one embodiment, in at least some of the training data elements, the satellite image shows routes which are not shown in the road usage image.

According to one embodiment, in at least some of the training data elements, the road usage image shows routes which are not shown in the satellite image.

According to one embodiment, the map data image is a visual map of the geographic region.

According to one embodiment, the map data image specifies a road network of the geographic region.

According to one embodiment, the generator neural network comprises a U-Net.

According to one embodiment, the generator neural network comprises an image concatenation layer for concatenating the satellite image and the road usage image.

According to one embodiment, training the generative adversarial network comprises training a discriminator of the generative adversarial network to decide whether map data image fed to the discriminator is a real map data image for a satellite image fed to the discriminator or a fake map data image for the satellite image.

According to one embodiment, the generative adversarial network comprises a discriminator comprising a convolutional network.

According to one embodiment, the discriminator comprises an image concatenation layer for concatenating a satellite image and a map data image which is fed to the discriminator to have the discriminator decide whether it is a real map data image for the satellite image or a fake map data image for the satellite image.

According to one embodiment, forming the road usage image comprises assigning a first pixel of two predetermined pixel values to a pixel if the pixel corresponds to a part of the geographic area which is specified by the road usage information to have been used for driving a vehicle and assigning a second pixel of two predetermined pixel values to a pixel if the pixel corresponds to a part of the geographic area which is not specified by the road usage information to have been used for driving a vehicle.

According to one embodiment, the road usage information is positioning system traces of vehicles.

According to one embodiment, acquiring road usage information comprises acquiring positioning system traces of vehicles of a transport service.

According to one embodiment, the method further comprises navigating one or more vehicles by the generated map data.

According to one embodiment, the method further comprises transmitting the generated map data to a vehicle and controlling the vehicle using the map data.

According to one embodiment, a server computer is provided including a radio interface, a memory interface and a processing unit configured to perform the method of any one of the above embodiments.

According to one embodiment a computer program element is provided including program instructions, which, when executed by one or more processors, cause the one or more processors to perform the method of any one of the above embodiments.

According to one embodiment a computer-readable medium is provided including program instructions, which, when executed by one or more processors, cause the one or more processors to perform the method of any one of the above embodiments.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

An e-hailing app, typically used on a smartphone, allows its user to hail a taxi (or also a private driver) through his or her smartphone for a trip.

Figure 1:
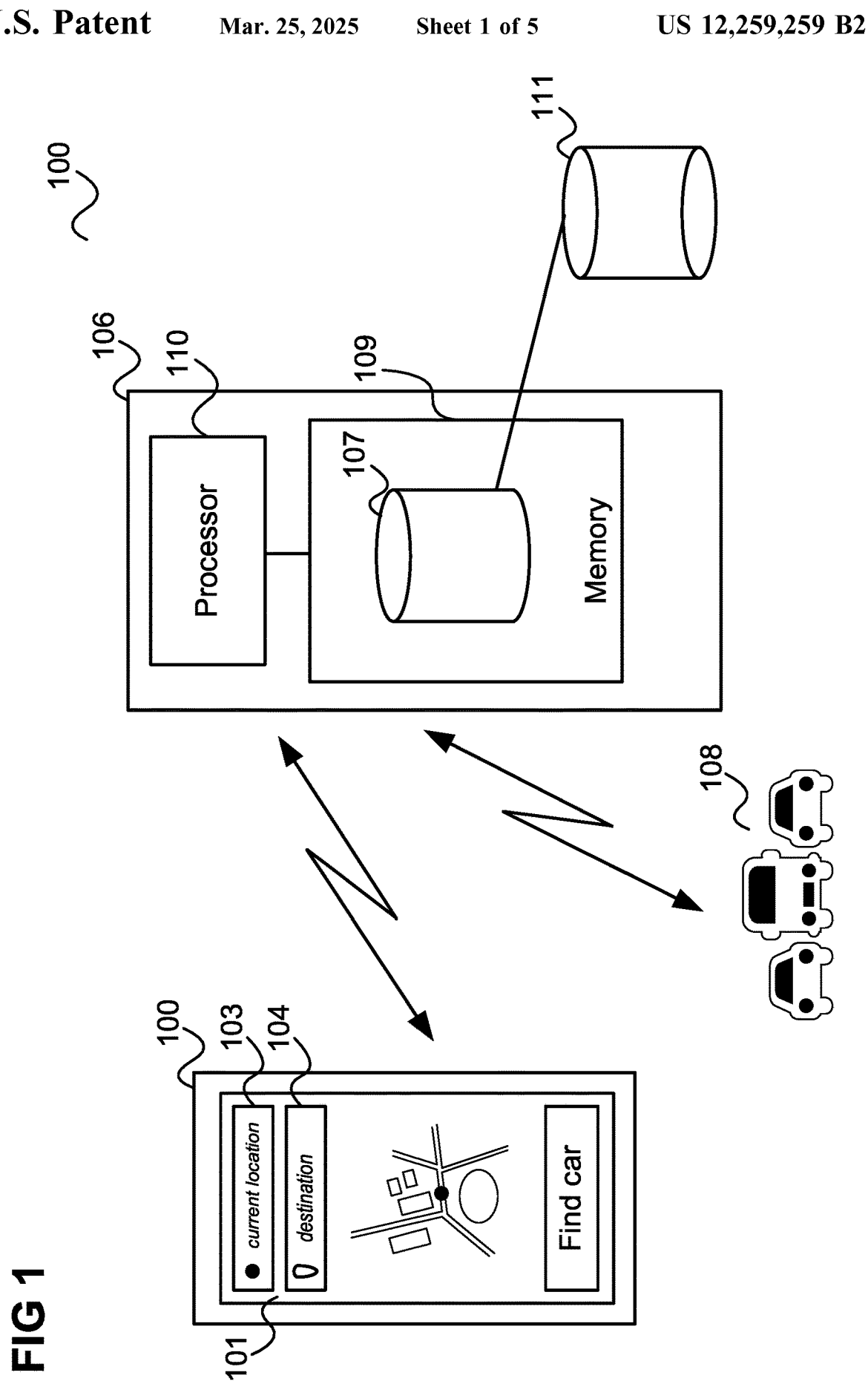
FIG. 1 shows a communication arrangement for usage of an e-hailing service including a smartphone and a server.

FIG. 1 shows a communication arrangement including a smartphone 100 and a server (computer) 106.

The smartphone 100 has a screen showing the graphical user interface (GUI) of an e-hailing app that the smartphone's user has previously installed on his smartphone and has opened (i.e. started) to e-hail a ride (taxi or private driver).

The GUI 101 includes a map 102 of the vicinity of the user's position (which the app may determine based on a location service, e.g. a GPS-based location service). Further, the GUI 101 includes a box for point of departure 103 (which may be set to the user's present location obtained from location service) and a box for destination 104 which the user may touch to enter a destination (e.g. opening a list of possible destinations). There may also be a menu (not shown) allowing the user to select various options, e.g. how to pay (cash, credit card, credit balance of the e-hailing service). When the user has selected a destination and made any necessary option selections, he or she may touch a "find car" button 105 to initiate searching of a suitable car.

For this, the e-hailing app communicates with the server 106 of the e-hailing service via a radio connection. The server 106 includes a database 107 having information about the current location of registered vehicles 108, about when they are expected to be free, about traffic jams etc. From this, a processor 110 of the server 106 selects the most suitable vehicle (if available, i.e. if the request can be fulfilled) and provides an estimate of the time when the driver will be there to pick up the user, a price of the ride and how long it will take to get to the destination. The server communicates this back to the smartphone 100 and the smartphone 100 displays this information on the GUI 101. The user may then accept (i.e. book) by touching a corresponding button. If the user accepts, the server 106 informs the selected vehicle 108 (or, equivalently, its driver), i.e. the vehicle the server 106 has allocated for fulfilling the transport request.

It should be noted while the server 106 is described as a single server, its functionality, e.g. for providing an e-hailing service for a whole city, will in practical application typically be provided by an arrangement of multiple server computers (e.g. implementing a cloud service). Accordingly, the functionality described in the following provided by the server 106 may be understood to be provided by an arrangement of servers or server computers.

To determine all route-related information, like the most suitable driver and an estimate of the time when the driver will be there to pick up the user, a price of the ride and how long it will take to get to the destination, the processor 110 access a database 107 storing map data including for example one or more road maps indicating where roads are located, the allowed direction of travel, speed limits, etc.

The database 107 is in this example implemented by a local memory 109 of the server computer 106. However, it may also be implemented at least partially externally to the server computer 106, e.g. in a cloud, and it may be filled by access to an external database 111, e.g. an open route map information database such as OSM (Open Street Map).

The service of ride-hailing providers significantly relies on accurate and up-to-date map data. For example, for determination of information like described above (e.g. estimated time to reach destination) or for navigation of the selected vehicle 108 (i.e. the vehicle 108 assigned to pick-up the user) the map data should be up to date and free of errors, e.g. should not lack travel possibilities (e.g. roads or allowed directions of travel) that exist in reality (i.e. in the physical geographic area represented by the map data).

Representing the map data into an image eases the service provider or the public to understand the geospatial semantics for a certain region. According to various embodiments, approaches for generating such a map image representing map data for a certain geographic area are provided. The map image may have a form to be easily visually interpreted by a human user but it may also be a (two or more dimensional) representation that is especially suited to be processed by a computer, for example a graph representation of a road network. Such a representation adapted for being processed by a computer may for example be stored in the database 107 to be processed by the server computer 106 (e.g. to determine the above-mentioned information like cost of ride) or may be supplied to a navigation system of the selected vehicle 108 (e.g. to help the driver navigate or navigate the vehicle, e.g. in case of an autonomous vehicle).

Map images may be generated by first collecting the geospatial data for each spatial entity in a geographic area by various devices and tools and then drawing or rendering a map image accordingly. The geospatial data usually describes the position of spatial entities, shape, and mutual relationship, etc.

For example, map drawing generates a bitmap image of a target area from vector data defining points, lines, and areas of geographical features such as Points of Interest (POI) and addresses, features such as roads and railways, cities, parks, and the like. Map images may also be rendered at a client device in a server-client setting. To achieve this, a map server selects map data from a geospatial database for a certain geographic area, generates multiple map image layers using the selected map data, and transmits them separately to the client device.

However, a concern regarding rendering map images based on pre-collected geospatial data is that field data collection is an expensive, time consuming, and cumbersome task, which restricts the map-update frequency to a few years or even longer for less populated and isolated places.

An alternative resource to facilitate the map image (or generally map data) generation process are satellite images because they represent the overall appearance of a geographic area. Modern satellite images have been quickly improved in terms of quantity, timeliness, quality, and contents diversity. Automatic conversion from satellite images allows generating map images in a cost-effective manner and with frequent updates.

However, approaches which leverage a satellite image as the only resource to generate a map image face the following challenges: 1) not all objects in a satellite image are visually distinguishable such as an underpass, a route with a very similar colour to its surrounding environments, etc. 2) the satellite image is common to include occlusion as cloud and shadow and these occlusion prevents these methods to reconstruct an accurate map. 3) Applying such an approach to regions with a road network which is of irregular shape and complex structure (like many South-eastern Asian Cities like Singapore), the spatial objects are small in size with tight arrangements leading to poor results.

In summary, approaches of a first type which generate map images from a collection of geospatial data usually generate maps with very accurate details but may not update quickly to reflect the latest geospatial information and approaches of a second type which generate map data from a satellite image allow generation of map data which is up-to-date but face challenges that many objects are not visually identifiable in satellite images.

To address the above issues, according to various embodiments, map data (i.e. in form of a map image) is generated by jointly using road usage information (e.g. crowd-sourced GPS traces specifying which routes have been taken by drivers) and a satellite image by means of a GAN (generative adversarial network). This may for example be performed by a server computer 106 of an e-hailing service. Compared to the approaches of the first type mentioned above, obtaining satellite images and crowd-sourced GPS traces is easier than collecting the geospatial data for each spatial entity. Compared to the approaches of the second type mentioned above, road usage information is a natural indicator of the underlying street network and it helps to recover the spatial objects more robust than satellite images in some visually challenged scenarios.

Figure 2:
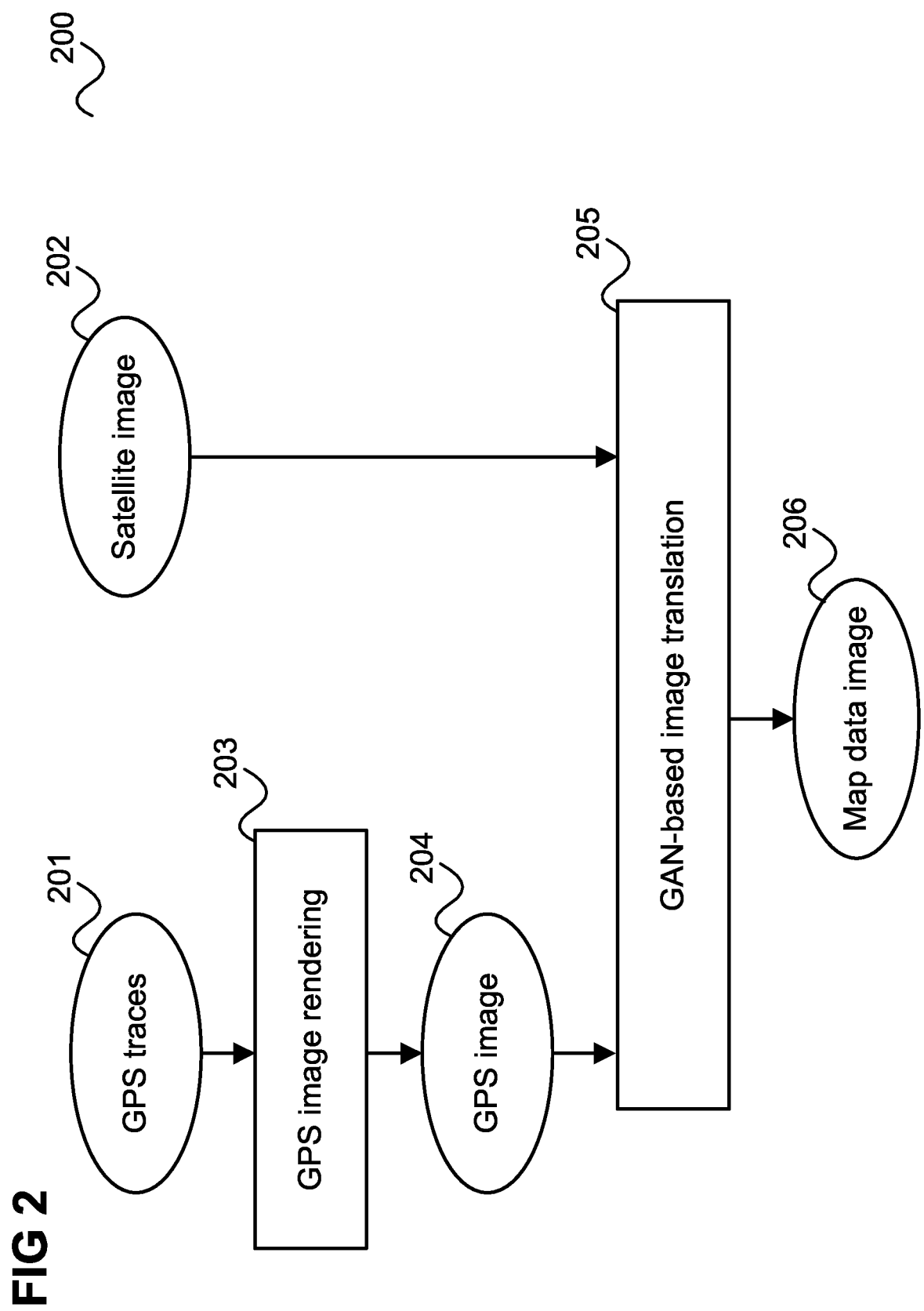
FIG. 2 shows a flow diagram illustrating an example for map data generation from road usage information and a satellite image.

FIG. 2 shows a flow diagram 200 illustrating an example for map data generation from road usage information (in this example in form of raw GPS traces) 201 and a satellite image 202.

The raw GPS traces may for example be recorded by vehicles 108, e.g. of an e-hailing service (or further vehicles). This means that vehicle 108 may record the routes they have taken and transmit this information to the server 106. The server 106 may collect these data to perform the map data generation of FIG. 2.

The server 106 may acquire the satellite image 202 from a satellite image database (i.e. from an Internet site providing satellite images).

In the example of FIG. 2, the map data is generated in form as a map image from a satellite image (or multiple satellite images) and GPS traces. Thus, the map data generation of FIG. 2 can also be seen as a conversion of a satellite image to a map image with the help of road usage information.

The raw GPS traces 201 and the satellite image 202 form an input pair. The pairing means that the raw GPS traces 201 specify routes which fall within the same geographical area as covered by the satellite image 202. The raw GPS traces 201 are converted to a GPS image 204 via GPS Image Rendering 203. The GPS image 204 (in general a road usage image) is used together with the satellite image 202 to output a map image 206 via a GAN-based Image Translation 205, i.e. using a GAN.

The GPS Image Rendering 203 converts the original GPS traces from a textual form into an image (GPS image 204). The GPS image 204 has the same number of pixels as its paired satellite image 202. The covered space for each pixel in GPS image is the same as the corresponding pixel in the satellite image. For each GPS image pixel, its covered space is first determined as a rectangle region (bounded by a minimal and maximal latitude and longitude). Then the raw GPS traces 201 are retrieved that fall within this rectangle region. For each GPS image pixel, its value is determined as one if there is at least one GPS trace falling into that pixel region (region covered by pixel) and zero otherwise. Thus, a binary GPS image 204 (e.g. representable in black and white) is rendered.

The GAN-based Image Translation 205 converts a pair of rendered GPS image 204 and satellite image 202 into a map image 206 using a GAN (or GAN-based model).

Figure 3:
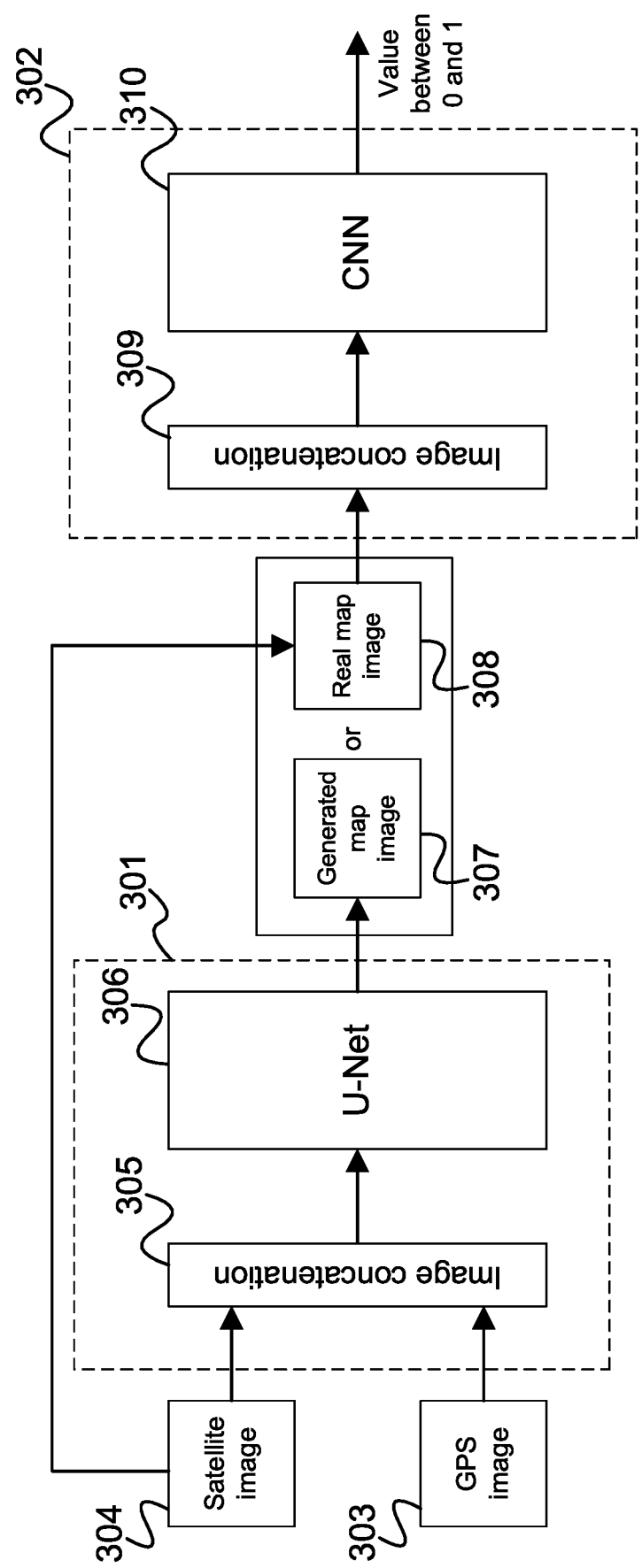
FIG. 3 shows a generative adversarial (neural) network (GAN).

FIG. 3 shows a GAN 300.

The GAN 300 is a neural network which contains two parts (i.e. two sub-networks): a generator (network) 301 and a discriminator (network) 302. The discriminator 302 is only used during the training phase, where both generator 301 and discriminator 302 are trained. After training, i.e. for GAN-based Image Translation 205 using actual input data 204, 202 (i.e. other than training data), the trained generator 301 is used. The discriminator 302 is no longer necessary.

According to one embodiment, the input of the generator 301 is a pair of GPS image 303 and a satellite image 304 where the GPS image 303 contains a single colour channel and the satellite image contains RGB three colour channels. The satellite image 304 and the GPS image 303 are concatenated in a channel-wise fashion. by image concatenation 305. Here, "channel-wise" means that a GPS image channel is added as a fourth channel to the RGB channels. The result of image concatenation 305 (i.e. the concatenated image data) is imported to a (trainable) U-Net 306. A U-Net has a U-shape architecture. This means that it includes a sequence of encoding layers followed by a sequence of decoding layers and involves down sampling (in the encoding layers) to a bottleneck and up sampling again to an output image (in the decoding layers), but links or skip-connections between encoding layers and decoding layers of the same size allow the bottleneck to be circumvented.

The output of the generator is a map image 307 that contains RGB three colour channels. The U-Net 306 contains, for example, 8 encoding layers and, for example, 8 decoding layers with skip connections. Each of the first seven encoding layers is a convolutional layer with 4×4 filters, followed by batch normalization and LeakyReLU activation. Last encoding layer is a convolutional layer with 4×4 filters, followed by ReLu activation. Each of the first seven decoding layers is a transpose convolutional layer with 4×4 filters, followed by batch normalization, dropout (for the first three decoding layers) and ReLu activation. Last decoding layer is a transpose convolutional layer with 4×4 filters, followed by Tanh activation. The number of filters for each of the 8 convolutional layers is for example 64, 128, 256, 512, 512, 512, 512, 512 respectively. The number of filters for each of the 8 transpose convolutional layers is for example 512, 512, 512,512, 256, 128, 64, 3, respectively.

When training the GAN 300, the satellite image 304 and the GPS image 303 come from training data. The training data includes training data elements wherein each training data element includes a satellite image 304 and a GPS image 303. At least some of the training data elements further include a real street map image of the area covered by the satellite image 304 and the GPS image 303, i.e. a ground truth image (also referred to as target image). These images may be obtained from databases, recording of driver routes (with GPS image rendering) etc.

For training the GAN 300, the input of the discriminator 302 is a pair of input images which is either

- a pair of the satellite image 304 of a training data element and a map image 308 of the training data element or
- a pair of a satellite image 304 of a training data element and a map image 307 generated by the generator 301 from the satellite image 304 and the GPS image 303 of the training data element.

The discriminator concatenates the two input images of its input image pair in a channel-wise manner by image concatenation 309 and the result of is image concatenation 309 fed to a trainable CNN (convolutional neural network). The CNN 310 outputs a value between 0 and 1 where a larger value indicates that the map image of the input image pair is more likely to be a plausible transformation from the satellite image of the input image pair (i.e. is likely no fake). The CNN 310 contains, for example, 6 convolutional layers. The filter size is 4×4 and the number of filters are 64, 128, 256, 512, 512 and 1 in each convolutional layer. Each of the first five convolutional layers is followed Batch Normalization (except the first convolutional layer) and LeakyReLu activation. The last convolutional layer is followed by a Sigmoid activation.

The discriminator 302 may for example be trained to minimize the negative log likelihood of identifying real and fake images. This may be done by updating its weights using backpropagation.

The generator 301 may be trained using both an adversarial loss (punishing that the discriminator 302 recognizes an image generated by the generator 301 as fake) and an L1 or mean absolute pixel difference loss between an image generated from a satellite image of training data element and the map image included in the training data element (i.e. the expected target image or ground truth image). The adversarial loss is for example a binary cross-entropy loss (applied to the output, which is between 0 and 1, of the CNN 310).

The adversarial loss and the L1 loss may be combined into a composite loss function, which is used to update the weights of the generator 301 using backpropagation. The adversarial loss influences whether the generator model can output images that are plausible in the target domain, whereas the L1 loss regularizes the generator 301 to output images that are a plausible translation of the source image. The combination of the L1 loss to the adversarial loss may be controlled by a hyperparameter, e.g. a, e.g. set to 100, thus giving a times the importance of the L1 loss than the adversarial loss to the generator during training: Generator Loss=Adversarial Loss+α*L1 Loss As usual, training is performed for batches of training data elements and loss is calculated over the training data elements of a batch. For example, the batch size is set as 32 and the epoch is 100. According to one embodiment, in the testing phase (i.e. neural network testing of the using testing data), only the generator 301 is used to generate map images.

Figure 4:
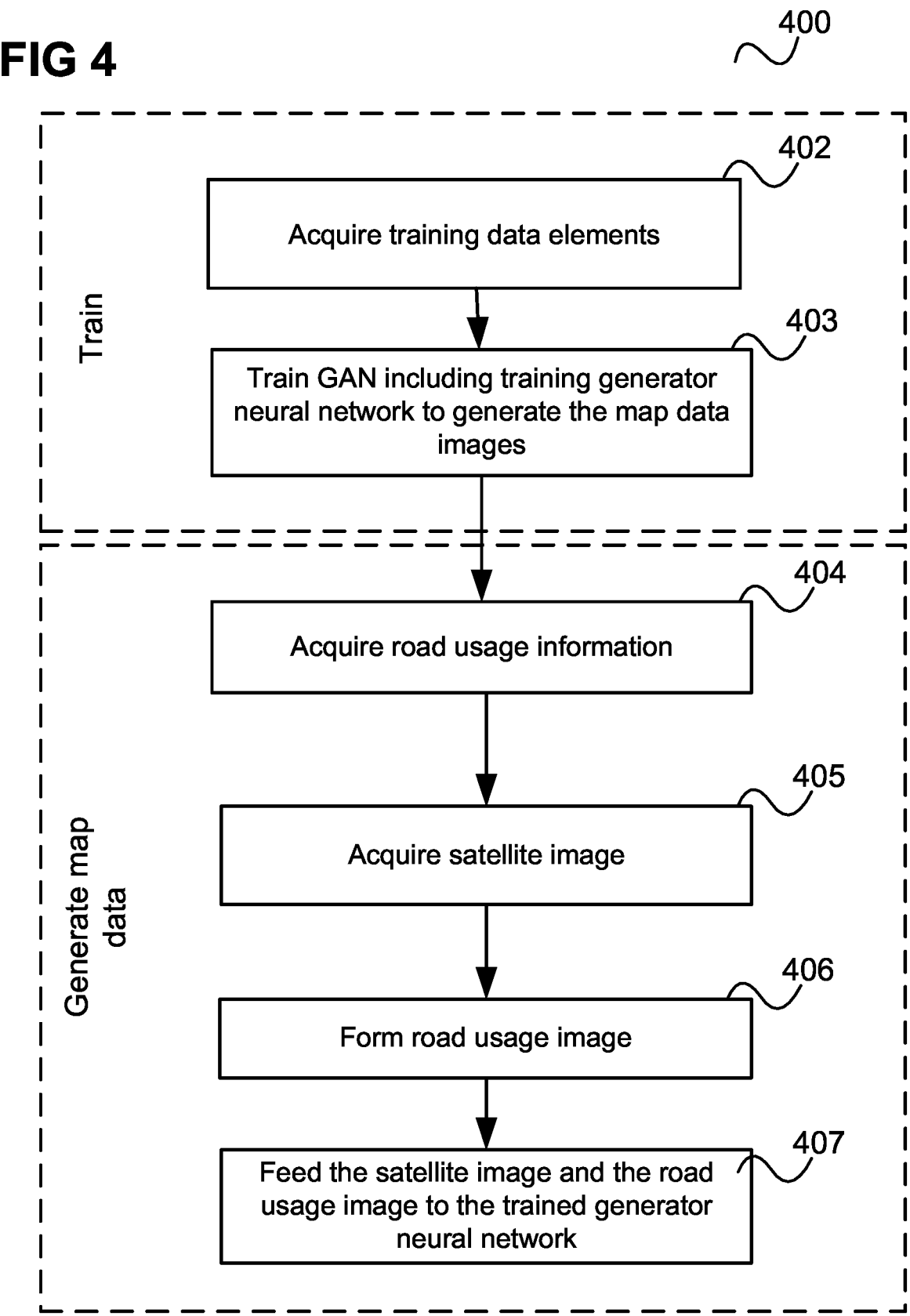
FIG. 4 shows a flow diagram illustrating a method for generating map data according to an embodiment.

In summary, according to various embodiments, a method is provided as illustrated in FIG. 4.

FIG. 4 shows a flow diagram 400 illustrating a method for generating map data, i.e. electronic map data or, in other words, digital map data.

In 401, a generator neural network is trained. This is performed by:

In 402, Acquiring training data elements for a generative adversarial network (GAN), each training data element comprising a satellite image of a geographical area, a road usage image of the geographical area which shows routes in the geographical area which may be used for driving a vehicle and a map data image of the geographical area; and In 403, training a generative adversarial network comprising the generator neural network (as generator network of the GAN, i.e. the generator neural network is the GAN's generator) using the training data elements, comprising training the generator neural network to generate, for a satellite image and a road usage image of a training data element, the map data image of the training data element.

In 404, map data for a geographical region (e.g. a part of a city or a whole city etc.) is generated. This is performed by:

In 405, acquiring road usage information specifying which parts of a geographical area have been used for driving a vehicle;

In 406, acquiring a satellite image of the geographical area;

In 407, forming a road usage image of the geographical area which has pixels, each pixel corresponding to a respective part of the geographical area, such each pixel has a pixel value indicating whether the part of the geographical area, to which the pixel corresponds, is specified by the road usage information to have been used for driving a vehicle; and In 408, feeding the satellite image and the road usage image to the trained generator neural network.

According to various embodiments, in other words, map data is generated by jointly using a satellite image and road usage information (e.g. GPS traces of vehicles of an e-hailing service) by means of a generative adversarial network (GAN). This means that map data is generated using road usage information and a satellite image as resources for map data generation. The map data is for example generated in the form of map image data such that, according to one embodiment, road usage information is fed and/or embedded into a GAN for satellite-to-map image conversion.

It should be noted that more than one satellite images may be acquired which may be seen to form, together, a big satellite image (even if being stored in separate image parts). So the term "satellite image" is understood to include the case of several satellite images.

The approach for map data generation of FIG. 4 is robust against the occlusions from either physical objects (e.g., underpass) or due to weather factors (e.g., cloud, shadow). Furthermore, a high quality of map data given a certain amount of training data can be achieved. This is especially beneficial in situations where only a small amount of training data (e.g. only 100-200 trainings images) is available.

The approach of FIG. 4 may be implemented using any GAN architecture (or GAN model). In particular, it may be incorporated into an existing device which uses a GAN as it is not required to modify the GAN architecture but only the GAN input. In comparison to an approach which uses pre-collected geospatial data, the approach of FIG. 4 allows generating map data that is more up-to-date with regard to geospatial semantics.

The method of FIG. 4 may be part of a method for controlling a vehicle (or controlling the navigation of a vehicle) wherein the map data is provided to a vehicle and the vehicle (or its navigation system) is controlled using the amended map data.

Figure 5:
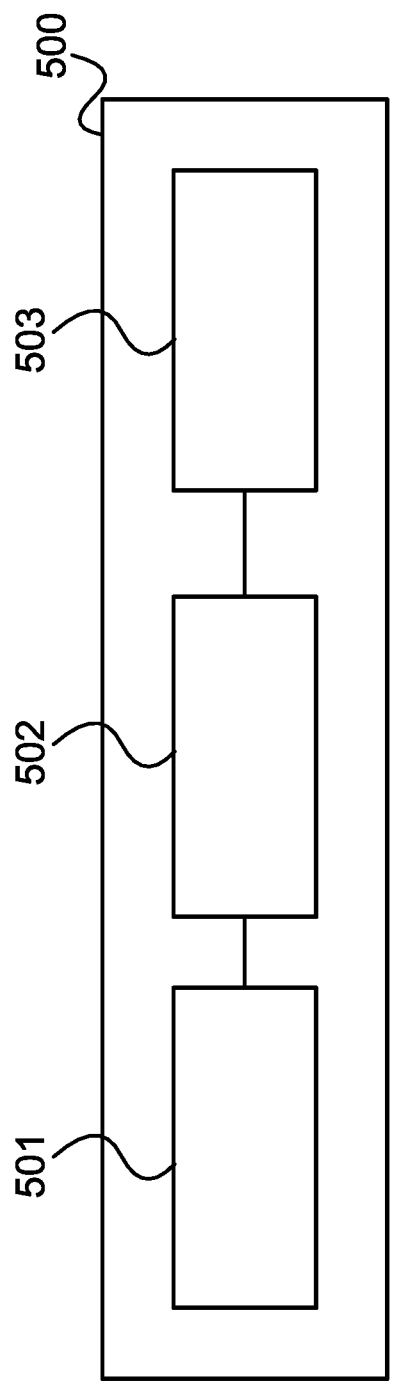
FIG. 5 shows a server computer according to an embodiment.

The method of FIG. 4 is for example carried out by a server computer as illustrated in FIG. 5.

FIG. 5 shows a server computer 500 according to an embodiment.

The server computer 500 includes a communication interface 501 (e.g. configured to receive road usage information and satellite images and/or to provide generated map data to another server (e.g. a navigation server) or a navigation device in a vehicle). The server computer 500 further includes a processing unit 502 and a memory 503. The memory 503 may be used by the processing unit 502 to store, for example, road usage information and a satellite image to be processed. The server computer is configured to perform the method of FIG. 4.

The methods described herein may be performed and the various processing or computation units and devices described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for generating map data comprising:
   training a generator neural network by
      acquiring training data elements for a generative adversarial network, each training data element comprising a satellite image of a geographical area, a road usage image of the geographical area which shows routes in the geographical area which may be used for driving a vehicle and a map data image of the geographical area, the satellite image an image of the geographical area and acquired from a satellite image database; and
      training the generative adversarial network by training the generator neural network, using the training data elements, to generate, for a satellite image and a road usage image of a training data element, the map data image of the training data element; and
   generating map data for a first geographical area by
      acquiring first road usage information specifying which parts of the first geographical area have been used for driving a vehicle, the first road usage information including one or more raw global positioning system (GPS) traces received from a plurality of vehicles that have driven in the first geographical area, the one or more raw GPS traces provided in a textual form;
      acquiring a first satellite image of the first geographical area;
      forming a first road usage image of the first geographical area by converting the one or more raw GPS traces from the textual form into the first road usage image using GPS image rendering, the first road usage image having pixels, each pixel corresponding to a respective part of the first geographical area, such that each pixel has a pixel value indicating whether the part of the first geographical area, to which the pixel corresponds, is specified by the first road usage information to have been used for driving a vehicle;
      feeding the first satellite image and the first road usage image to the trained generator neural network to produce a generated map data image of the first geographical area; and
      outputting the generated map data image for the first geographical area.

2. The method of claim 1, wherein in at least some of the training data elements, the satellite image shows routes which are not shown in the road usage image.

3. The method of claim 1, wherein in at least some of the training data elements, the road usage image shows routes which are not shown in the satellite image.

4. The method of claim 1, wherein the first map data image is a visual map of the first geographic area.

5. The method of claim 1, wherein the first map data image specifies a road network of the first geographic area.

6. The method of claim 1, wherein the generator neural network comprises a U-Net.

7. The method of claim 1, wherein the generator neural network comprises an image concatenation layer for concatenating the satellite image and the road usage image and for concatenating the first satellite image and the first road usage image.

8. The method of claim 1, wherein training the generative adversarial network comprises training a discriminator of the generative adversarial network to decide whether map data image fed to the discriminator is a real map data image for a satellite image fed to the discriminator or a fake map data image for the satellite image.

9. The method of claim 1, wherein the generative adversarial network comprises a discriminator comprising a convolutional network.

10. The method of claim 9, wherein the discriminator comprises an image concatenation layer for concatenating a satellite image and a map data image which is fed to the discriminator to have the discriminator decide whether it is a real map data image for the satellite image or a fake map data image for the satellite image.

11. The method of claim 1, wherein forming the first road usage image comprises assigning a first pixel value of two predetermined pixel values to a pixel if the pixel corresponds to a part of the first geographic area which is specified by the first road usage information to have been used for driving a vehicle and assigning a second pixel value of two predetermined pixel values to a pixel if the pixel corresponds to a part of the first geographic area which is not specified by the first road usage information to have been used for driving a vehicle.

12. The method of claim 1, wherein the first road usage information is positioning system traces of a plurality of vehicles.

13. The method of claim 1, wherein acquiring first road usage information comprises acquiring positioning system traces of a plurality of vehicles of a transport service.

14. The method of claim 1, further comprising navigating one or more vehicles by the generated map data image.

15. The method of claim 1, further comprising transmitting the generated map data image to a vehicle and controlling the vehicle using the generated map data image.

16. A server computer comprising a radio interface, a memory interface and a processing unit configured to perform the method of claim 1.

17. A computer program element comprising program instructions, which, when executed by one or more processors, cause the one or more processors to perform the method of claim 1.

18. A computer-readable medium comprising program instructions, which, when executed by one or more processors, cause the one or more processors to perform the method of claim 1.

* * * * *